US009724870B2

(12) United States Patent
Morrow

(10) Patent No.: US 9,724,870 B2
(45) Date of Patent: Aug. 8, 2017

(54) INTEGRATED SHAPE MEMORY POLYMER AND CAUL TOOL

(71) Applicant: Spirit AeroSystems, Inc., Wichita, KS (US)

(72) Inventor: Christopher J. Morrow, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 573 days.

(21) Appl. No.: 13/833,693

(22) Filed: Mar. 15, 2013

(65) Prior Publication Data
US 2014/0265014 A1 Sep. 18, 2014

(51) Int. Cl.
*B29C 61/02* (2006.01)
*B29C 33/48* (2006.01)
*B29C 70/44* (2006.01)

(52) U.S. Cl.
CPC ............. *B29C 61/02* (2013.01); *B29C 33/48* (2013.01); *B29C 70/44* (2013.01)

(58) Field of Classification Search
CPC ....... B29C 61/02; B29C 61/025; B29C 61/04; B29C 71/02; B29C 63/42; B29C 70/44; B29C 70/40; B29C 33/48; B29C 33/00; B29C 70/42; B29C 67/24; B64C 2001/0054; B64C 1/00; B32B 1/08; B32B 1/02
USPC ....... 264/230, 313, 318, 319, 325, 346, 348, 264/320; 156/165; 244/117 R, 119, 120, 244/125; 29/448, 449
See application file for complete search history.

(56) References Cited

U.S. PATENT DOCUMENTS

| 5,817,269 A * | 10/1998 | Younie | B29C 33/38 249/82 |
|---|---|---|---|
| 2007/0175031 A1* | 8/2007 | Pham | B64C 1/064 29/889.2 |
| 2010/0123270 A1* | 5/2010 | Owens | B29C 33/485 264/318 |
| 2012/0118486 A1 | 5/2012 | Everhart et al. | |
| 2012/0118487 A1* | 5/2012 | Havens | B29C 33/00 156/165 |

OTHER PUBLICATIONS

Thermal Expansion Phenolic Composites. Plastic Material Data Sheets. 2010.*
Thermal Expansion Stainless Steel. Metal Material Data Sheets. 2010.*

* cited by examiner

*Primary Examiner* — Matthew Daniels
*Assistant Examiner* — Leith S Shafi
(74) *Attorney, Agent, or Firm* — Hovey Williams LLP

(57) ABSTRACT

A method of forming a composite material part using an integrated shape memory polymer (SMP) and caul tool comprises the steps of: placing a caul on a positive feature of a mold, deforming the SMP from a relaxed state such that the SMP integrates with the caul to form an integrated SMP and caul tool, placing composite material on the integrated SMP and caul tool, heating the composite material to cure the composite material to form a composite material part while the SMP remains deformed, and stimulating the SMP to return to the relaxed state such that the SMP separates from the caul and the composite material part.

10 Claims, 12 Drawing Sheets

INTEGRATED SHAPE MEMORY POLYMER AND CAUL TOOL

BACKGROUND OF THE INVENTION

Field of the Invention

Embodiments of the current invention relate to forming composite material parts.

Description of the Related Art

Shape memory polymer (SMP) is a polymeric material that is able to exist in at least two stable states: a first state, known as the relaxed or recovered state, which is the default state for the material, and a second state, known as the deformed state, in which the material has been shaped into a desired form often by heating the material to a temperature beyond its glass transition temperature while the material is adapted to a mold after which the material is cooled. SMP has been used as a tool to form composite material parts. However, in some situations, the final parts may have certain deficiencies, due in part to the fact that the SMP may not be completely rigid during curing of the composite material. For example, the parts may experience resin pooling in certain areas. In some instances, the surface smoothness of the parts may not meet design requirements. In other instances, parts that have a curvature between two planar surfaces may not meet design requirements. In still other instances, parts with a wall that is formed between two SMP tools may not be completely planar.

SUMMARY OF THE INVENTION

Embodiments of the current invention solve the above-mentioned problems and provide a distinct advance in the art of forming composite material parts.

A first embodiment of the current invention provides a method of forming a composite material part using an integrated shape memory polymer (SMP) and caul tool. The method comprises the steps of: placing a caul on a positive feature of a mold, deforming the SMP from a relaxed state such that the SMP integrates with the caul to form an integrated SMP and caul tool, placing composite material on the integrated SMP and caul tool, heating the composite material to cure the composite material to form a composite material part while the SMP remains deformed, and stimulating the SMP to return to the relaxed state such that the SMP separates from the caul and the composite material part.

A second embodiment of the current invention provides a method of forming a composite material part using an integrated shape memory polymer (SMP) and caul tool. The method comprises the steps of: placing a caul with a part contact surface in a shape memory polymer deforming tool such that the part contact surface contacts a planar surface, deforming the SMP from a relaxed state such that the SMP integrates with the caul to form an integrated SMP and caul tool, placing composite material on a layup tool, placing the integrated SMP and caul tool on the composite material adjacent to a deformed SMP tool with space therebetween, placing composite material in the space between the integrated SMP and caul tool and the deformed SMP tool, heat the composite material to cure the composite material to form a composite material part while the SMP of both the integrated SMP and caul tool and the deformed SMP tool remains deformed, and stimulate the SMP of the integrated SMP and caul tool to return to the relaxed state such that the SMP separates from the caul and the composite material part.

A third embodiment of the current invention provides an integrated shape memory polymer (SMP) and caul tool for forming a composite material part. The tool comprises a caul and an SMP. The caul may be formed from rigid material and may include a part contact surface with negative features corresponding to positive features of the composite material part and an SMP contact surface including an interlocking feature. The SMP may be in a rigid, deformed state and may have an outer surface shaped to correspond to an inner mold line of the composite material part and shaped to wrap around the interlocking feature of the caul so that the caul does not separate from the SMP. The outer surface may include negative features corresponding to positive features of the composite material part.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
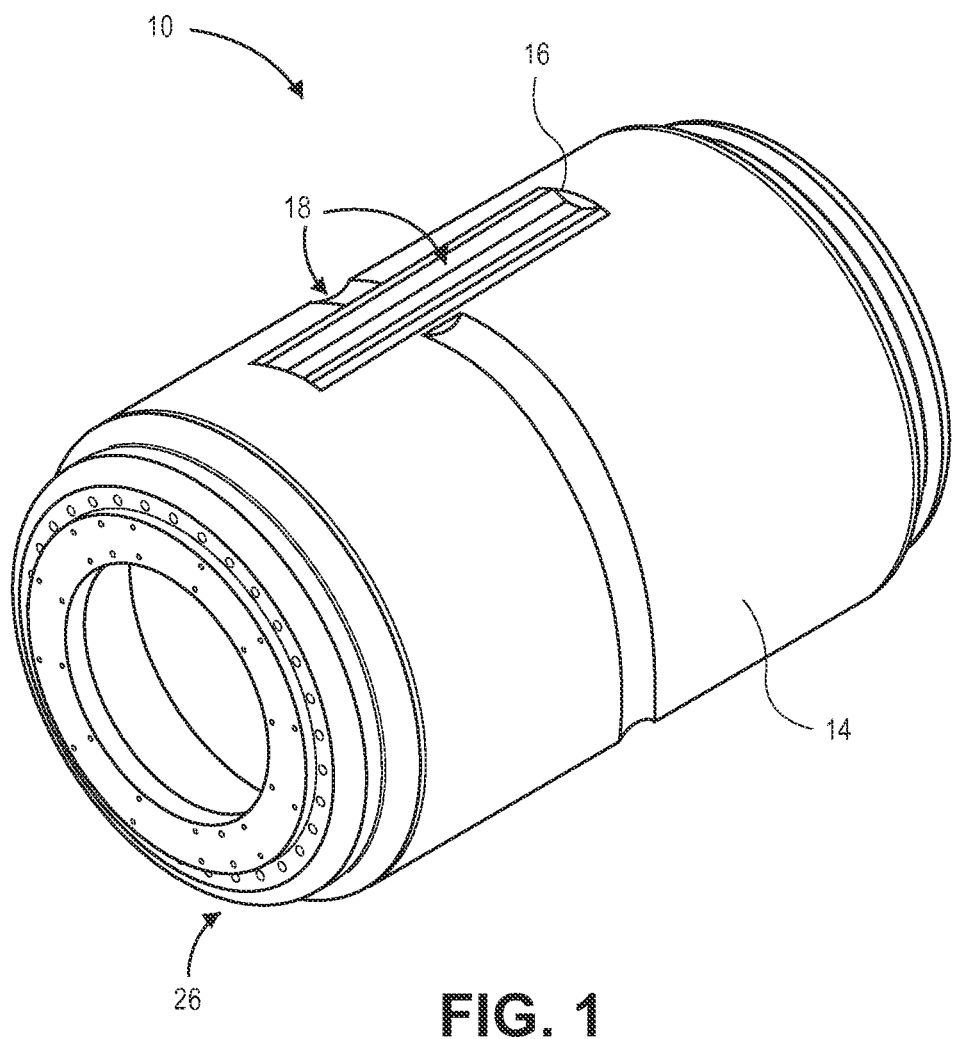
FIG. 1 is a perspective view of an integrated shape memory polymer and caul tool and an internal forming cylinder constructed in accordance with various embodiments of the current invention.
Figure 2:
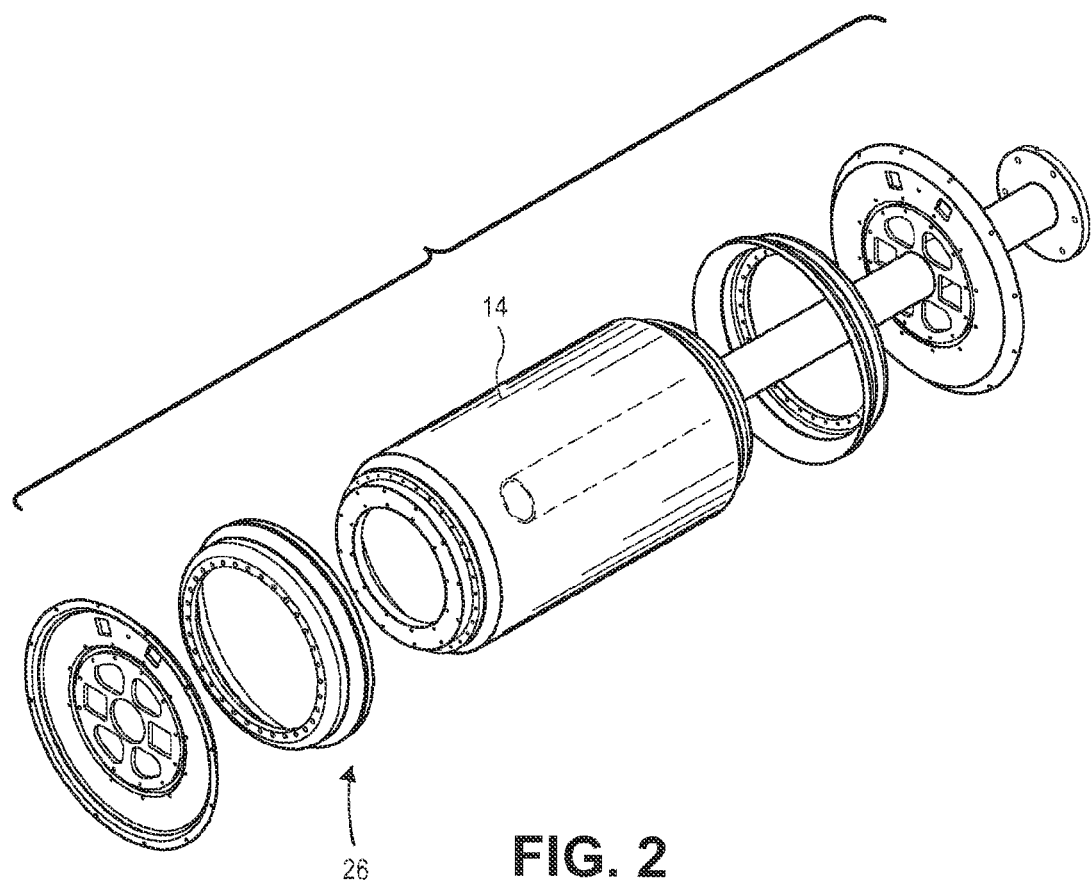
FIG. 2 is a perspective view of a shape memory polymer and the internal forming cylinder.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

An integrated shape memory polymer (SMP) and caul tool 10 as constructed in accordance with various embodiments of the current invention is shown in FIG. 1. The integrated SMP and caul tool 10 may be utilized to form a composite material part 12, such as the one shown in FIG. 10, and may broadly comprise an SMP 14 and one or more cauls 16.

The SMP 14, seen in FIGS. 1-2 and 5-8, generally provides a reformable tool which may be used to form and cure composite material. The SMP 14 may include materials such as epoxies or materials with bases such as epoxy, styrene copolymers, cyanate ester, polyurethane, polyethylene homopolymer, styrene-butadiene, polyisoprene, copolymers of stearyl acrylate and acrylic acid or methyl acrylate, norbonene or dimethaneoctahydronapthalene homopolymers or copolymers, malemide, and the like, or combinations thereof. In general, numerous other types of SMP materials exist and can be tailored to meet specific tolerances and temperature requirements.

The modulus of the SMP 14 material can be changed through several different methods, such as a temperature change, an electric current, water, and/or light. However, the exemplary methods described herein disclose the use of temperature changes to transform the SMP 14 from a malleable state to a rigid state and vice versa. Nevertheless, any of the above-listed triggers for changing the modulus of the SMP 14 may be used for the composite part fabrication methods described herein without departing from the scope of the invention.

A glass transition temperature (Tg) of the material of the SMP 14 is defined herein as a threshold temperature at and/or above which the SMP 14 material begins to transition to a lower modulus state, becoming soft and/or malleable in order to be deformed. Therefore, the SMP 14 of the present invention may be configured to begin to become flexible and formable when it is heated above its Tg and to become rigid when cooled to a temperature below its Tg. If the SMP 14 is deformed at a temperature above Tg and then held in that deformed state as its temperature drops below Tg, then the SMP 14 hardens in that deformed state. When heated again, the SMP 14 may generally return to its originally-cast memory shape unless otherwise acted on by another force. While the modulus change of the SMP 14 may begin at Tg, there may be a range of transition temperatures through which the SMP 14 may become increasingly malleable.

The SMP 14 may be made of a material having any Tg appropriate for the uses and methods described herein. For example, in various embodiments of the invention, Tg may be greater than the curing temperature of the composite material used to make the composite material part 12 such that the SMP 14 remains rigid during at least a portion of the curing cycle.

While the SMP 14 may have any Tg, in some example embodiments of the invention, Tg may be a temperature between 100° F. and 700° F. Specifically, Tg may be a temperature between 100° F. and 200° F., 200° F. and 300° F., or between 300° F. and 400° F. More specifically, Tg may be a temperature between 125° F. and 175° F., 250° F. and 300° F., or 350° F. and 400° F. In one embodiment of the invention, Tg of the SMP 14 may be approximately equal to 143° F., 275° F., or 375° F. The SMP 14 may become increasingly malleable when heated through a transition range of temperatures beginning at or centered around Tg and may gradually harden to its rigid stare when cooled through the transition range of temperatures to a temperature at or below Tg.

The SMP 14 may be presented in many different forms and shapes. An exemplary SMP 14, as shown in the figures, may have a hollow cylindrical, tubular, or barrel shape with a circumferential wall having a length, diameter, and thickness that can be set according to specification.

The caul 16, seen in FIGS. 1 and 3-8, generally provides a rigid, fixed-shape tool which may be used to form and cure composite material. The caul 16 may be constructed from any rigid materials such metals, hardened polymers, ceramics, or the like. In certain embodiments, the caul 16 may be constructed from semi-rigid materials that are able to flex somewhat. However, in order not to introduce any defects or affect the tolerances of the final composite material part 12, the material of the caul 16 often has a coefficient of thermal expansion (Cte) that is close to the Cte of the composite material used to form the part 12. Exemplary composite materials that are used to form the composite material part 12 include low temperature resin, high temperature resin, toughened resin, prepreg, wet processed fiber, dry fiber, continuous fiber, discontinuous fiber, chopped fiber, glass, KEVLAR, carbon, and/or core. Core is defined herein as any offset component separating two layers of composite material. For example, core may comprise foam, thermoplastic, honeycomb materials, aluminum, fiberglass phenolic, carbon, Nomex, etc. Core may also be referred to as core panels, honeycomb core, or sandwich panel core. Furthermore, the chemical makeup of the composite material may include epoxy, BMI, benzoxazine, vinyl, acrylic, polyester, polyamide, phthalonitrile, and any other similar substances known in the art. Thus, the caul 16 may be constructed from any of the listed materials.

Figure 3:
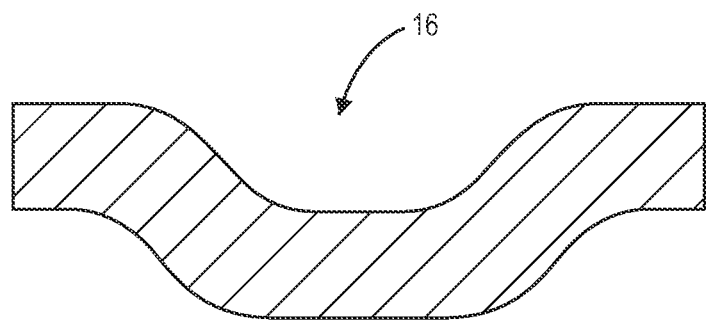
FIG. 3 is a sectional view of a caul.

The caul 16 may be formed using techniques that are known, such as laying up composite material on a tool and then heating the tool and the material to cure the material. The caul 16 may be formed to have a negative feature 18, which is the negative of any type of shape or surface feature of the composite material part 12. Although, generally, the caul 16 is used to form a subfeature or a set of features of a larger part. Particularly, the caul 16 may be used to form a feature that requires a smooth surface, a feature that is curved or radiused such as a bend or the line where one planar surface transitions to a non-planar surface, or a feature that is curved or radiused such as a bend or the line between two planar surfaces that intersect at an angle, as seen in FIG. 3. In addition, the caul 16 may be used in areas where excess resin forms during or after curing of the composite material part 12. Therefore, the caul 16 may take any shape to meet these requirements. Furthermore, in some embodiments, a single caul 16 may be formed to include a plurality of negative features 18, each one relating to a shape or feature of the final composite material part 12. In other embodiments, a plurality of cauls 16 may be used to form all of the shapes or features, with each caul 16 including a negative feature 18 for at least one shape or feature of the composite material part 12.

Figure 6:
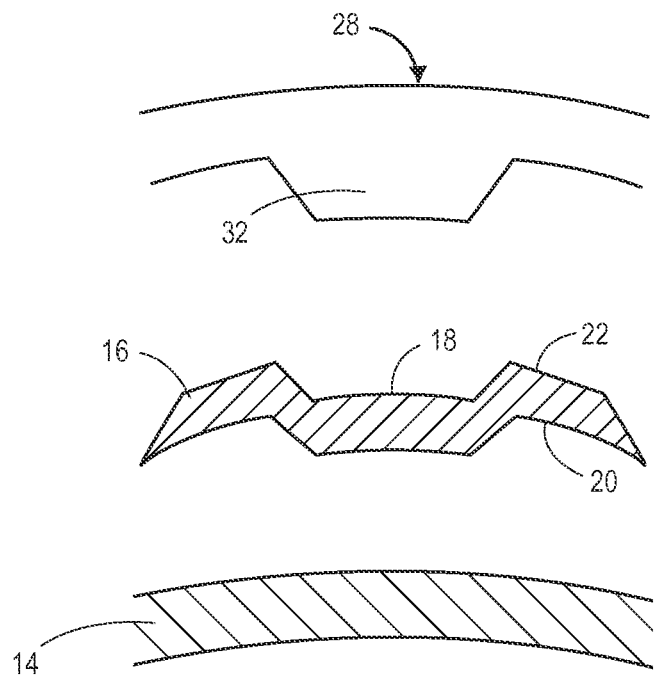
FIG. 6 is a sectional view cut along a vertical plane in FIG. 5 of a portion of the shape memory polymer deforming tool, the caul, and a portion of the shape memory polymer before deforming the shape memory polymer and creation of the integrated shape memory polymer and caul tool.
Figure 7:
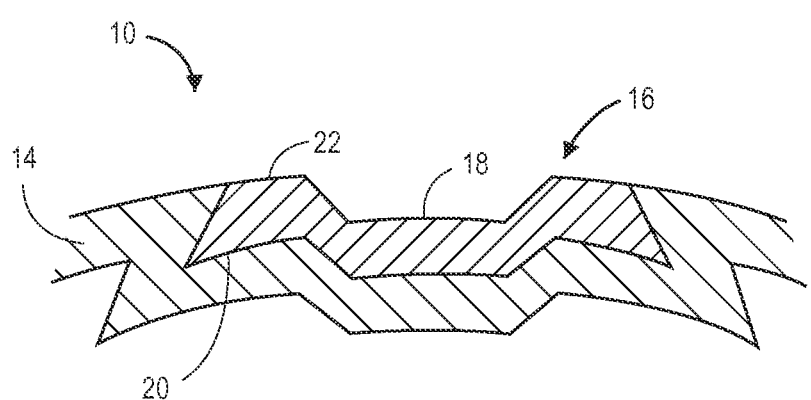
FIG. 7 is a sectional view cut along a vertical plane in FIG. 1 of a portion of the integrated shape memory polymer and caul tool.

The caul 16 may include an SMP contact surface 20 and a part contact surface 22. The SMP contact surface 20 generally integrates with the SMP 14 to form the integrated SMP and caul tool 10. In some embodiments, the SMP contact surface 20 may be formed to be removable from the SMP 14, once the SMP 14 has been changed from its originally-cast memory shape to its deformed shape. Thus, the SMP contact surface 20 may include simple geometry that is merely complementary to the SMP 14. With this configuration, the caul 16 may receive a different type or form of composite material from the rest of the composite material part 12, or may receive composite material at a different time or in a different location and then may be replaced or reintegrated with the SMP 14. In other embodiments, the SMP contact surface 20 may be formed to be non-removable from the SMP 14. Hence, the SMP contact surface 20 may include surface features or geometry that interlocks with features or geometry of the SMP 14. For example, the caul 16 may be formed to include beveled edges, as are shown in FIGS. 6-7. In such an embodiment, the edges of the caul 16 create a convex geometry, around which the SMP 14 wraps when it is deformed. As a result, the caul 16 cannot easily be separated from the SMP 14.

The part contact surface 22 generally receives the composite material that forms the composite material part 12 and may be shaped to include the negative features 18 as discussed above.

Figure 5:
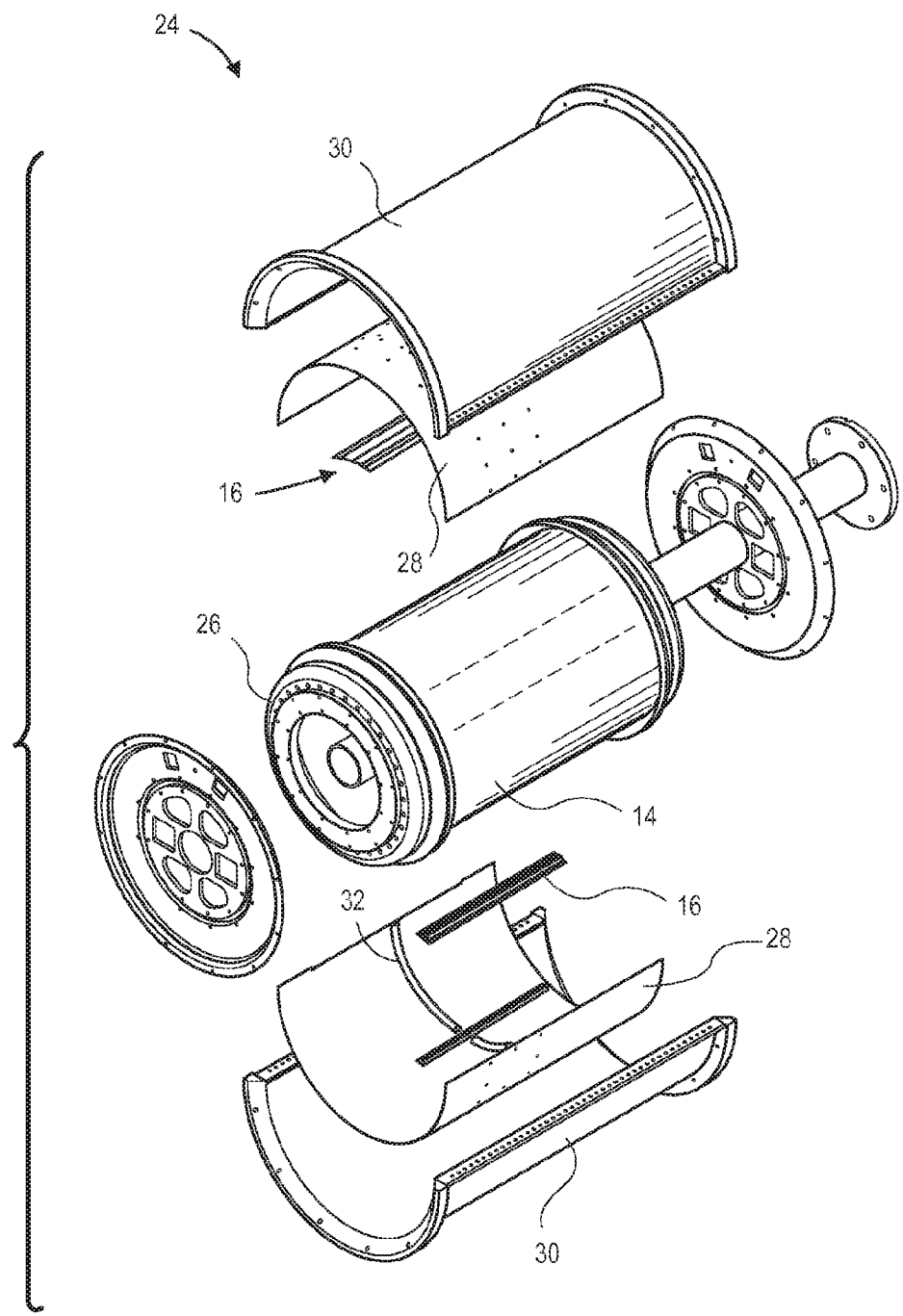
FIG. 5 is a perspective view of the shape memory polymer, the internal forming cylinder, the shape memory polymer deforming tool, the cauls, and external forming shells before deforming the shape memory polymer.

The integrated SMP and caul tool 10 must be formed or reformed every time it is used to create a composite material part 12. Therefore, embodiments of the current invention may utilize an SMP deforming tool 24 not only to deform the SMP 14 but also to integrate the SMP 14 with the caul 16. The SMP deforming tool 24, as seen in FIG. 5, may include components that differ from what is described herein based on whether the integrated SMP and caul tool 10 is utilized to form an inner mold line (IML) or an outer mold line (OML) as well as other factors. An exemplary SMP deforming tool 24 may include an inner shell 26, an outer forming mold 28, and an outer shell 30.

The inner shell 26 generally provides internal support for the SMP 14 while it is being deformed and may be hollow or may be mostly solid with one or more sidewalls that typically includes one or more holes through the sidewall. An exemplary inner shell 26 may have a hollow cylindrical shape with a circumferential sidewall. The inner shell 26 may be constructed from rigid materials such as metals, hardened polymers, ceramics, or the like. If the inner shell 26 is mostly solid, then there are generally channels through the sidewall that connect the holes to ports at least one end of the inner shell 26. The holes generally allow air or gas to pass through the sidewall to create a positive or negative pressure differential. For example, a negative pressure may be applied to the holes in order to create a vacuum along the outer surface of the inner shell 26. Or, a positive pressure may be applied to the holes in order to inflate objects on the outer surface of the inner shell 26. In certain embodiments, the inner shell 26 may include a bladder or inflatable skin along its outer surface. In some embodiments, if the integrated SMP and caul tool 10 is used to form the OML of the composite material part 12, then the outer surface of the inner shell 26 may include features with the same shape as those of the outer surface of the composite material part 12.

Figure 4:
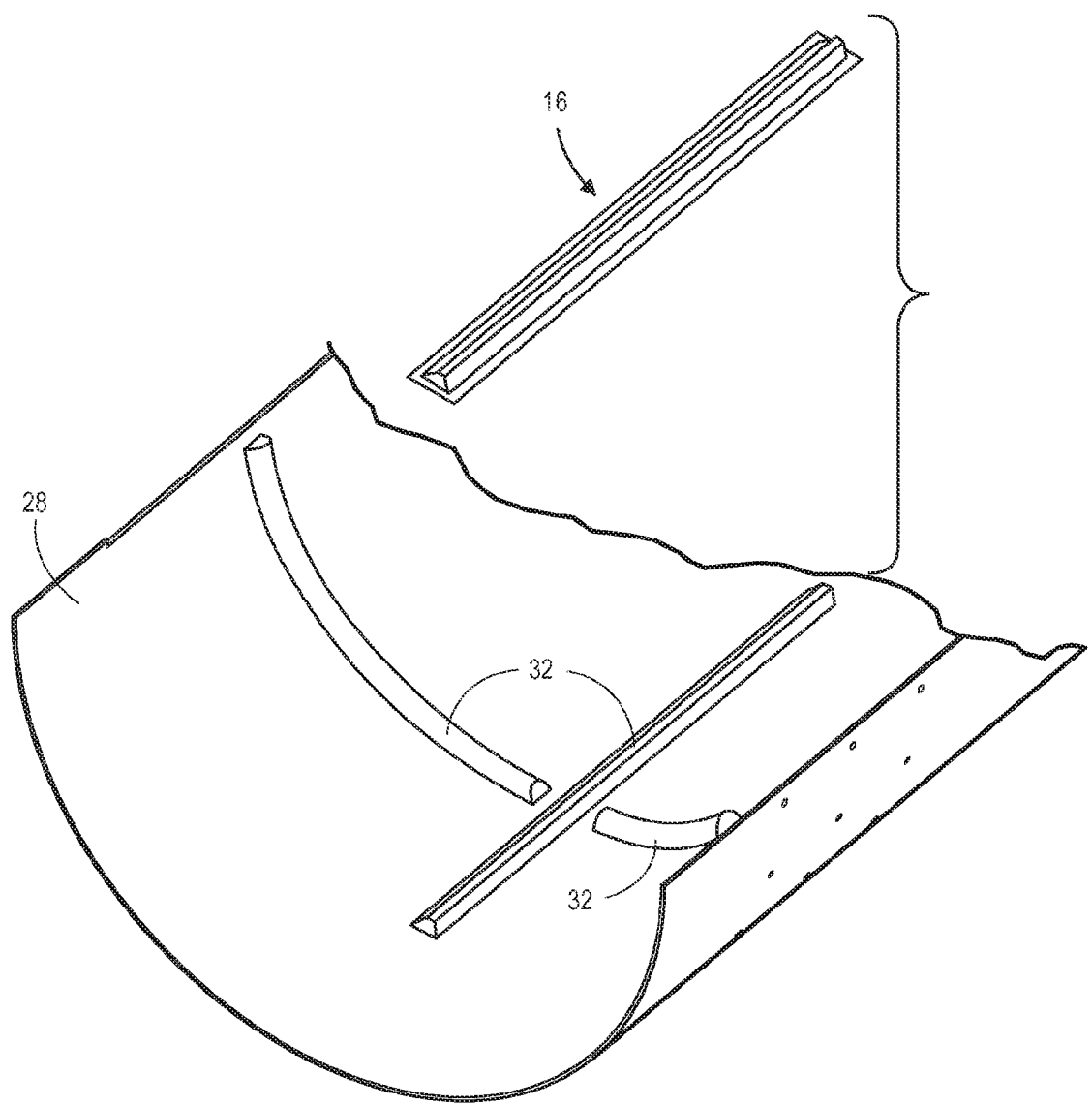
FIG. 4 is a perspective view of a portion of a shape memory polymer deforming tool along with the caul.

The outer forming mold 28 generally replicates the final composite material part 12 to be made and provides the IML features that the integrated SMP and caul tool 10 will form on the composite material part 12. Thus, the outer forming mold 28 may include one or more positive features 32 on its inner surface which relate to all of the IML features. Furthermore, the inner surface of the outer forming mold 28 includes positive features 32 of the IML which will be formed by the caul 16. Since the outer forming mold 28 typically surrounds at least a portion of the SMP 14, it usually includes two or more pieces that are assembled or coupled together during the deforming of the SMP 14. Each piece of the outer forming mold 28 may have the shape of a portion of the IML of the composite material part 12. An exemplary outer forming mold 28 may include two pieces, each with a semi cylindrical shape as best seen in FIGS. 4-5.

The outer shell 30 generally surrounds the outer forming mold 28 and may provide external support during the SMP 14 deformation process. The outer shell 30 may also be sealable such that a chamber can be formed in combination with the inner shell 26 to allow a pressure differential to be applied. Like the outer forming mold 28, the outer shell 30 surrounds at least a portion of other components—in this case, the outer forming mold 28. Thus, like the outer forming mold 28, the outer shell 30 may include two or more pieces that are assembled or coupled together during the deforming of the SMP 14. An exemplary outer shell 30 may include two pieces, each with a semi cylindrical shape as best seen in FIG. 5.

The integrated SMP and caul tool 10 may be formed by positioning the one or more cauls 16 in the SMP deforming tool 24 and then deforming the SMP 14. With the SMP deforming tool 24 disassembled, shown in part in FIG. 4 and in full in FIG. 5, the cauls 16 may be placed on the appropriate positive features 32 of the outer forming mold 28. In the exemplary embodiment of FIG. 5, two cauls 16 are used—a first caul 16 for a feature on the upper piece of the outer forming mold 28, and a second caul 16 for a feature on the lower piece of the outer forming mold 28. With the cauls 16 in place on the outer forming mold 28, the SMP deforming tool 24 may be assembled with the pieces of the outer forming mold 28 and the outer shell 30 being put together so that they surround the SMP 14 which is positioned on the inner shell 26.

With the SMP deforming tool 24 assembled and sealed, the SMP deforming process begins. In some embodiments, a slight positive pressure may be applied to the inner shell 26. In other embodiments, no pressure is applied. The temperature within the SMP deforming tool 24 may be raised above Tg. The SMP 14 may become soft and malleable. At this point, a greater positive pressure may be applied to the inner shell 26 which serves to expand the SMP 14 and press it against the outer forming mold 28 and the cauls 16. On the outer surface of the SMP 14, negative features 18 are formed that correspond to and complement the positive features 32 of the outer forming mold 28. In addition, the SMP 14 adapts to the cauls 16. If the cauls 16 are designed to be removable, then the SMP 14 takes the shape of the SMP contact surface 20 of each caul 16. If the cauls 16 are designed to be non-removable, then the SMP 14 wraps around the interlocking features of the SMP contact surface 20, such as beveled edges like the ones shown in FIGS. 6-7, so that the cauls 16 cannot easily be removed when the SMP deforming process is finished. When the SMP 14 has formed negative features 18 for all of the positive features 32 of the outer forming mold 28 and the cauls 16 are integrated with the SMP 14, then the temperature within the SMP deforming tool 24 is lowered to below Tg typically well below Tg. The SMP 14 may become rigid again. The pressure applied to the inner shell 26 may be reduced. At this point, the SMP deforming process is complete. The outer shell 30 and the outer forming mold 28 of the SMP deforming tool 24 may be disassembled and removed. The integrated SMP and caul tool 10, as shown in FIG. 1, is ready to form a composite material part 12.

The integrated SMP and caul tool 10 may be used to form a composite material part 12 as follows. Before usage, the integrated SMP and caul tool 10 may be formed as described above. In some embodiments, the integrated SMP and caul tool 10 may continue to rest on or be supported by the inner shell 26 of the SMP deforming tool 24 or a similar component to facilitate handling of the integrated SMP and caul tool 10. The exemplary integrated SMP and caul tool 10 shown in the figures may be used to form an aircraft fuselage or at least a portion of a fuselage. In addition, the exemplary integrated SMP and caul tool 10 is utilized to form the features of the IML of the fuselage. Thus, the integrated SMP and caul tool 10 can form interior surface features of the fuselage such as longitudinal-axis oriented stringers, circumferentially-oriented frame members, and the like. In this example, the fuselage includes two stringers, one upper and one lower, and one frame member. Furthermore, the design specifications require that the tolerances of the stringers are critical. As a result, the integrated SMP and caul tool 10 includes two cauls 16, one for each stringer. The integrated SMP and caul tool 10 also includes negative features 18 deformed in the SMP 14 for the frame member.

Composite material 34, of the types mentioned above, may be placed on the integrated SMP and caul tool 10 in the negative features 18 of the SMP 14 and the cauls 16. In the example shown in FIG. 8, composite material 34 may be placed in the frame member negative features 18 of the SMP 14 as well as the stringer negative features 18 on the part contact surface 22 of each caul 16. The composite material 34 may be placed on the integrated SMP and caul tool 10 using nearly any method known in the art. After the composite material 34 has filled the negative features 18 of the integrated SMP and caul tool 10, then a composite material skin 36 may be placed over the integrated SMP and caul tool 10 and the composite material 34, as shown in FIG. 9.

The combination of the integrated SMP and caul tool 10, the composite material 34, and the composite material skin 36 may be heated in order to cure the composite material 34 and the composite material skin 36, which form the composite material part 12. The combination may be heated in an oven, a furnace, or an autoclave using known techniques. The SMP 14 material, the composite material 34, and the composite material skin 36 may all be chosen such that the cure temperature of the composite material 34 and the composite material skin 36 is less than or much less than Tg. Thus, the combination of the integrated SMP and caul tool 10, the composite material 34, and the composite material skin 36 may be heated to a temperature less than Tg.

Figure 10:
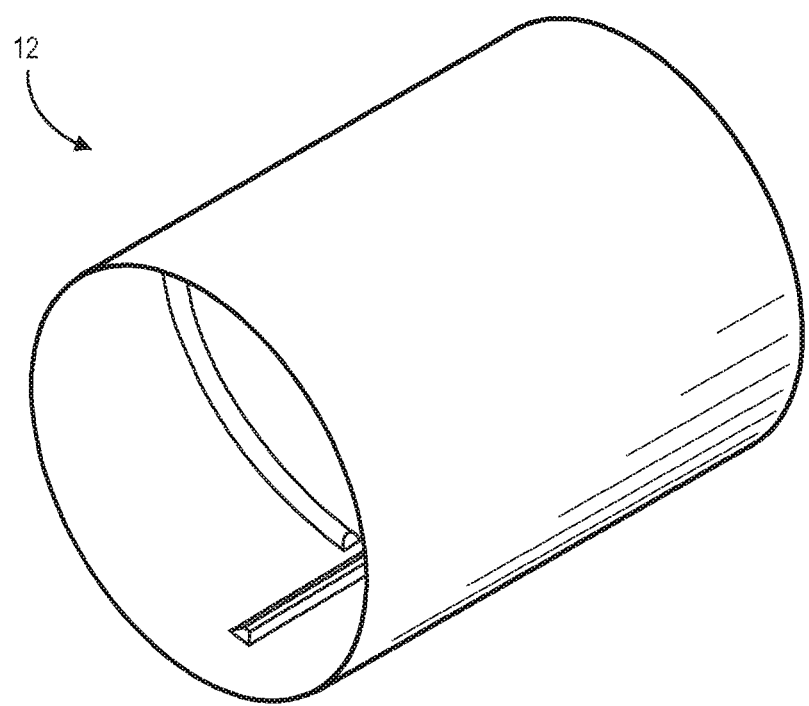
FIG. 10 is a perspective view of the composite material part after cure and removal of the integrated shape memory polymer and caul tool.

After curing, the combination of the integrated SMP and caul tool 10, the composite material 34, and the composite material skin 36 may be heated to a temperature greater than Tg. In some embodiments, after curing, the temperature may be lowered so that the combination can be moved, the inner shell may be removed, or other handling procedures can be performed, and then the temperature may be raised to above Tg. In certain embodiments, the temperature of only the integrated SMP and caul tool 10 may be raised to above Tg while the temperature of the other components may be held constant or lowered. In any event, with the temperature of the integrated SMP and caul tool 10 above Tg, the SMP 14 portion may become malleable and, in the absence of a pressure or other deforming force, the SMP 14 may shrink, recede, or contract and return to a relaxed or recovered state. At this point, the integrated SMP and caul tool 10 no longer exists in its previous form, and the SMP 14, without the cauls 16, may be removed from the composite material part 12. In some embodiments, the cauls 16 may be attached to or retained by the composite material part 12, and they may be removed by simply pulling on them. In other embodiments, the cauls 16 may fall away from the composite material part 12, separate from the SMP 14. The composite material part 12, as shown in FIG. 10, may be ready for use or for further processing.

The integrated SMP and caul tool 10 may be used to form another composite material part 12 after it has been reformed, as described above.

Figure 11:
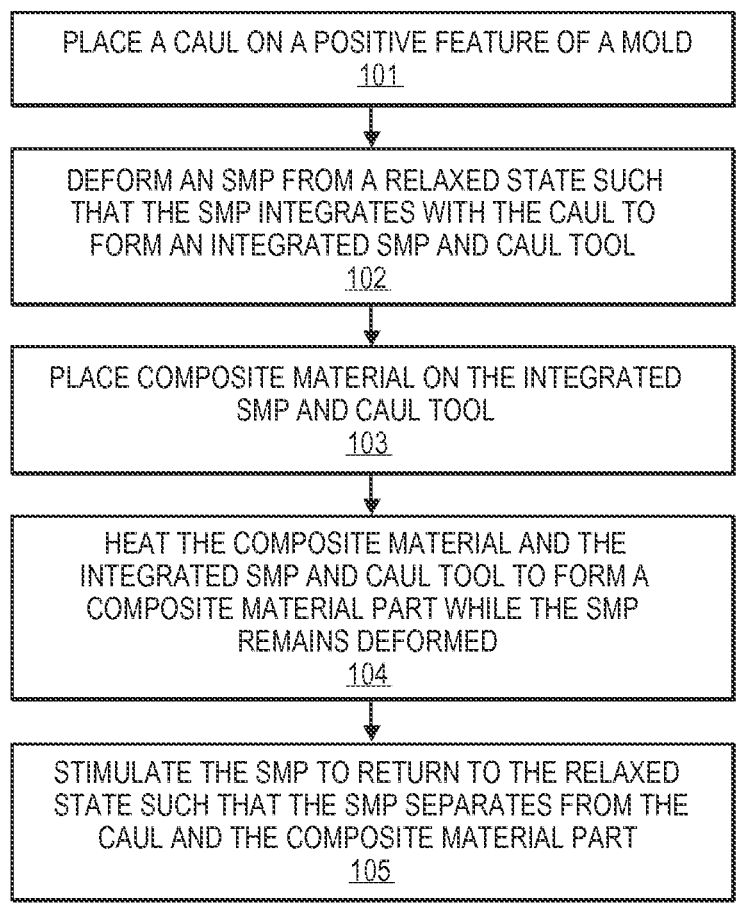
FIG. 11 is a flow diagram of at least a portion of the steps of a method of forming a composite material part using the integrated shape memory polymer and caul tool.

At least a portion of a method 100 of forming a composite material part 12 using the integrated SMP and caul tool 10 in accordance with various embodiments of the current invention is shown in FIG. 11. The steps may be performed in the order shown in FIG. 11, or they may be performed in a different order. Furthermore, some steps may be performed concurrently as opposed to sequentially. In addition, some steps may be optional.

Referring to step 101, a caul 16 is placed on a positive feature 32 of a mold, as shown in FIG. 4. The caul 16 may be constructed from rigid material and may have a Cte that is roughly the same as the composite material 34 used to form the composite material part 12. The caul 16 may have a negative feature 18 that corresponds to the positive feature 32 on the mold. The positive feature 32 may correspond to a feature of the composite material part 12—particularly along the IML of the composite material part 12. Typically, the positive feature 32 on which the caul 16 is placed is a feature that includes a curved or radiused portion, as shown in FIG. 3, a feature which requires a smooth surface, a feature around which resin may be pooling with conventional techniques, or the like. The mold may be an outer forming mold 28 of an SMP deforming tool 24.

Referring to step 102, an SMP 14 is deformed from a relaxed state such that the SMP 14 integrates with the caul 16 to form an integrated SMP and caul tool 10. The SMP 14 may include shape memory polymer materials as listed above with a glass transition temperature Tg. The SMP 14 may be deformed using an SMP deforming tool 24 such that the SMP 14 is positioned on an inner shell 26, as seen in FIG. 5. The outer forming mold 28 with the caul 16 may surround the SMP 14 and the inner shell 26. In various embodiments, the outer forming mold 28 may include a plurality of positive features that correspond to features of the composite material part 12. Accordingly, there may be more than one caul 16, wherein the other cauls 16 are placed on other positive features 32. The SMP deforming tool 24 may also include an outer shell 30 which surrounds the outer forming mold 28 so that the SMP deforming tool 24 forms a sealable chamber.

Once the outer shell 30 is in place around the outer forming mold 28 and the SMP deforming tool 24 is sealed, the SMP 14 may be heated to a temperature above Tg. Either after the temperature has been raised or at the same time, a positive pressure may be applied to the inner shell 26 so that the SMP 14 is inflated or expanded. The SMP 14 may be pressed against the outer forming mold 28 and the cauls 16. On the outer surface of the SMP 14, negative features 18 are formed that correspond to and complement the positive features 32 of the outer forming mold 28. In addition, the SMP 14 adapts to the cauls 16 such that the cauls 16 are integrated with the SMP 14 and the integrated SMP and caul tool 10 is formed.

Figure 8:
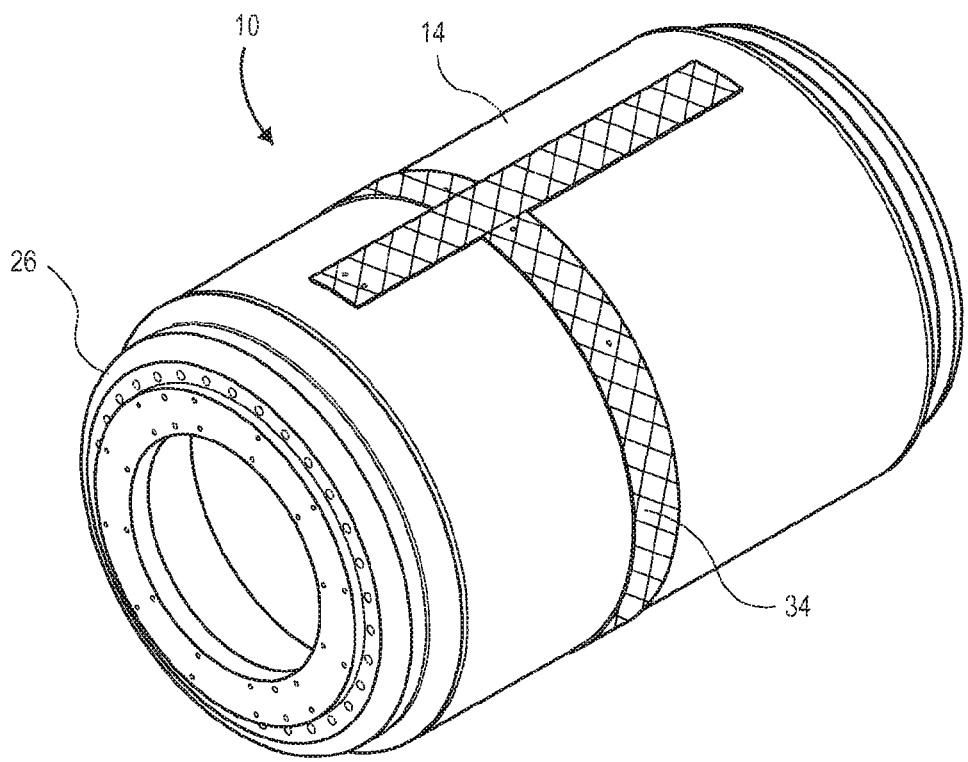
FIG. 8 is a perspective view of the integrated shape memory polymer and caul tool and the internal forming cylinder after composite material has been placed on the caul and features along the circumference of the shape memory polymer.
Figure 9:
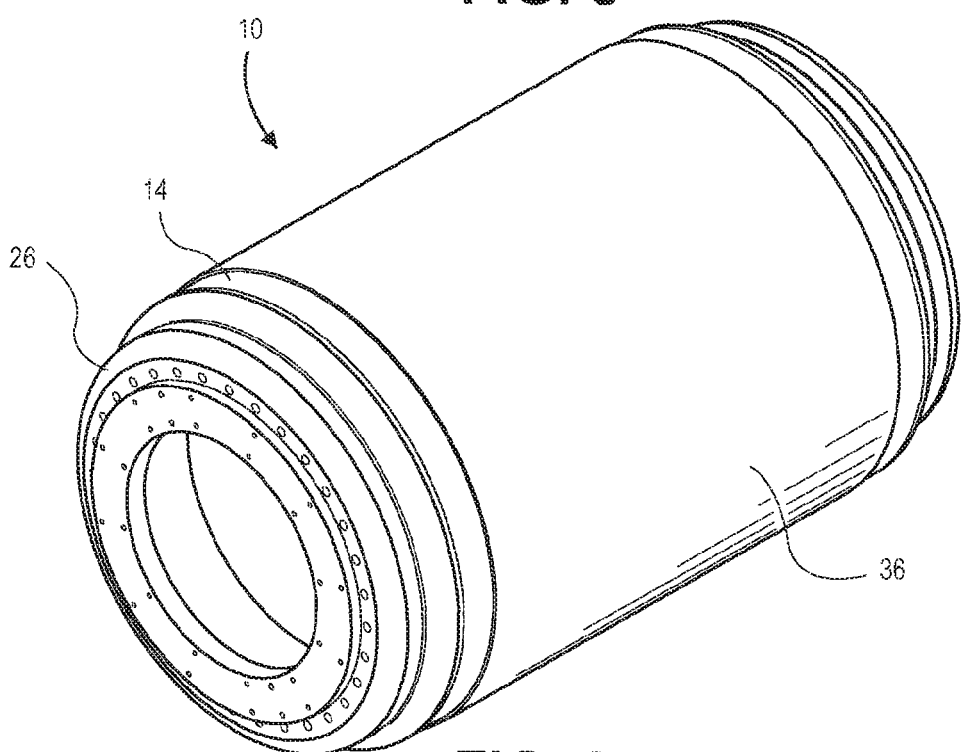
FIG. 9 is a perspective view of the integrated shape memory polymer and caul tool and the internal forming cylinder after a composite material skin has been placed on the tool and the other composite material.

Referring to step 103, composite material 34 is placed on the integrated SMP and caul tool 10, as seen in FIGS. 8-9. The composite material 34 may be of the types discussed above and may be placed on the negative features 18 of both the SMP 14 and the caul 16 portions of the integrated SMP and caul tool 10. The composite material 34 may be placed on the integrated SMP and caul tool 10 using nearly any method known in the art.

Referring to step 104, the composite material 34 and the integrated SMP and caul tool 10 are heated to cure the composite material 34 to form a composite material part 12 while the SMP 14 remains deformed. The composite material 34 may be heated to a temperature below Tg.

Referring to step 105, the SMP 14 is stimulated to return to the relaxed state such that SMP 14 separates from the caul 16 and the composite material part 12. Although there are other ways to stimulate the SMP 14 to change its state, in this embodiment, the integrated SMP and caul tool 10 is heated to a temperature above Tg. The SMP 14 becomes malleable and, in the absence of a deforming force or pressure, the SMP 14 shrinks, recedes, or contracts to return to a relaxed or recovered state. At this point, the integrated SMP and caul tool 10 no longer exists in its previous form, and the SMP 14, without the cauls 16, may be removed from the composite material part 12. The cauls 16 may be removed separately. The composite material part 12, as shown in FIG. 10, may be ready for use or for further processing.

Figure 12:
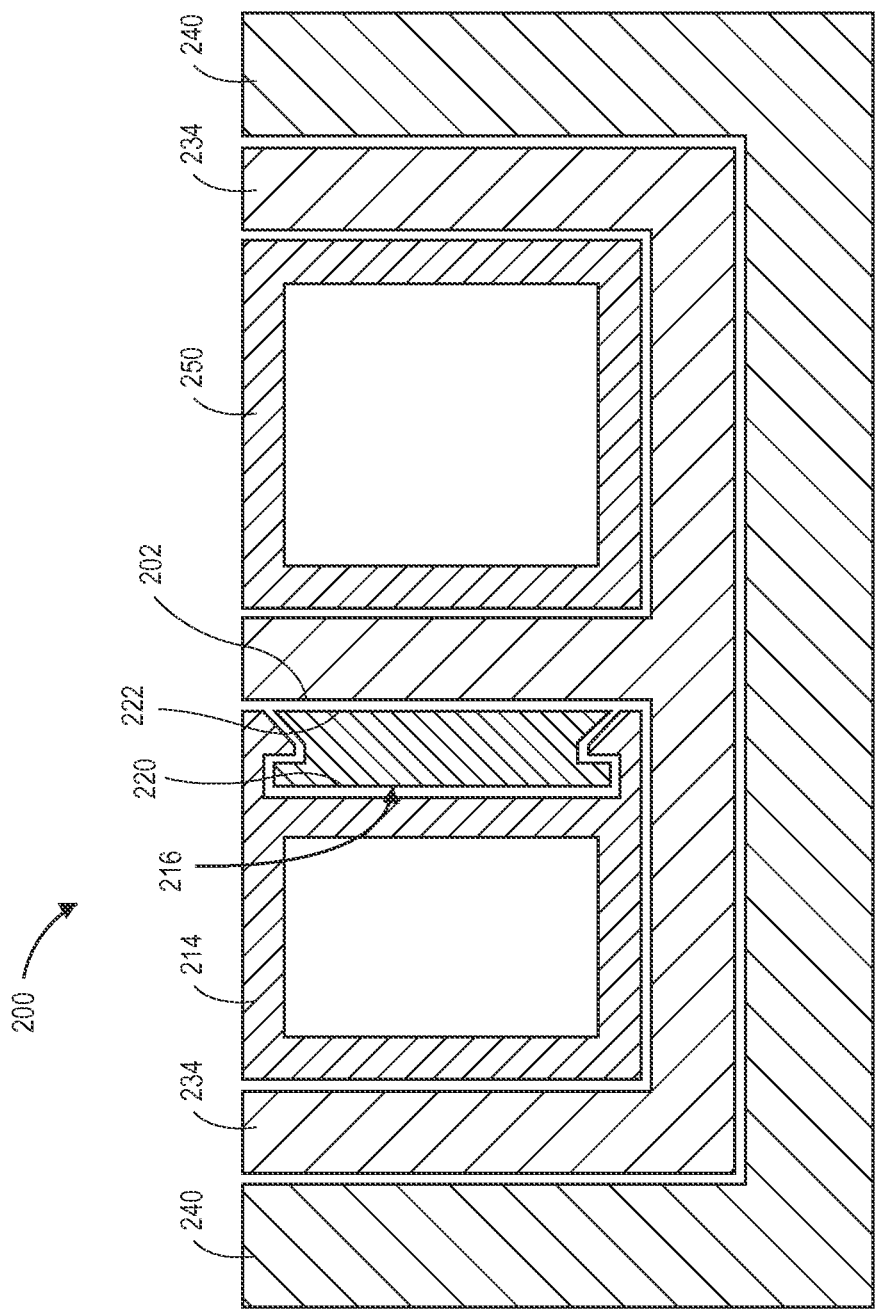
FIG. 12 is a sectional view of a second embodiment of the integrated SMP and caul tool being utilized to form a composite material part.
Figure 14:
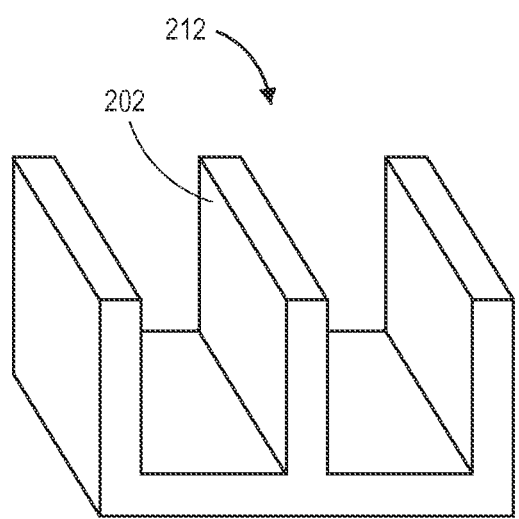
FIG. 14 is a perspective view of the composite memory part after curing.

A second embodiment of the integrated SMP and caul tool 200 is shown in FIG. 12. The integrated SMP and caul tool 200 may be utilized to form a planar surface 202 on a composite material part 212, as shown in FIG. 14. The integrated SMP and caul tool 200 may broadly comprise an SMP 214 and one or more cauls 216.

The SMP 214 may be substantially similar to the SMP 14 and in its relaxed or recovered state may have a hollow cylindrical, tubular, or barrel shape with a circumferential wall having a length, diameter, and thickness that can be set according to specification.

Figure 13:
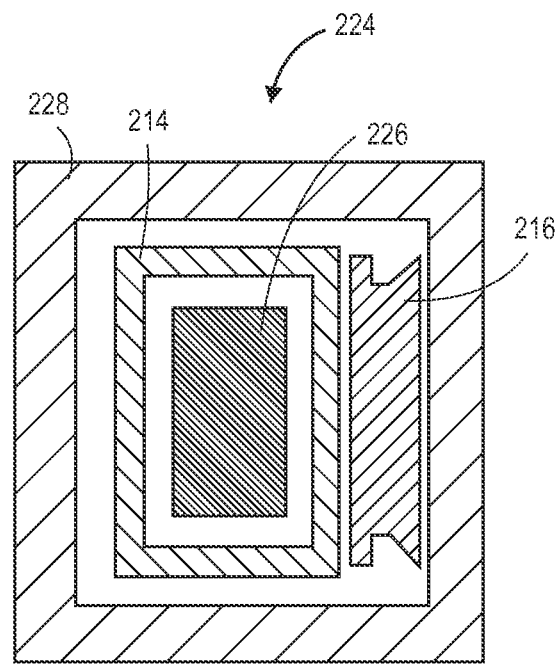
FIG. 13 is a sectional view of a second embodiment of the shape memory polymer deforming tool along with the shape memory polymer and the caul.

The caul 216 may have some similarities to the caul 16 such as having a rigid, fixed shape with an SMP contact surface 220 and a part contact surface 222. The caul 216 may also be constructed from material with a Cte that is roughly equal to the Cte of the composite material, although in some embodiments the caul 216 may be constructed from semi-rigid materials that have some flexibility. The SMP contact surface 220 may integrate with the SMP 214 to form the integrated SMP and caul tool 200. In addition, the SMP contact surface 220 may include surface features or geometry that interlocks with features or geometry of the SMP 214. For example, the SMP contact surface 220 may be formed to include beveled edges or tabs, as shown in FIGS. 12-13. In such an embodiment, the edges of the caul 216 create a geometry around which the SMP 214 wraps when it is deformed. As a result, the caul 216 cannot easily be separated from the SMP 214.

The part contact surface 222 may contact the composite material 234 used to form the composite material part 212. However, instead of having negative features 18 to match the features, particularly the IML features, of the composite material part 212, the part contact surface 222 is generally planar in order to form the planar surface 202 or wall of the composite material part 212. The part contact surface 222 may be roughly the same size as the first planar surface 202 along a first dimension, but, in order to allow room for the interlocking features of the SMP contact surface 220, the part contact surface 222 may be smaller than the first planar surface 202 along a second dimension. For example, the part contact surface 222 may have a similar length to the adjacent planar surface 202 of the composite material part 212 (also seen as part of the center wall of the composite material part 212 of FIG. 14). But, along the height of the planar surfaces, the part contact surface 222 may be shorter than the planar surface 202, as shown in FIG. 12.

The integrated SMP and caul tool 200 may formed using an SMP deforming tool 224 with some similarities to the SMP deforming tool 24 including an inner shell 226 and an outer forming mold 228, as seen in FIG. 13. An outer shell may be optionally included. In some embodiments, the inner shell 226 may be similar to the inner shell 26 in that the SMP 214 is placed on the inner shell 226 during deforming. In other embodiments, the inner shell 226 may not be used and the SMP 214 may be pressurized and deformed without the inner shell 226. The outer forming mold 228 may include at least one planar surface to correspond to the part contact surface 222 of the caul 216. Otherwise, the outer forming mold 228 may include surfaces or features that correspond to the surfaces and features of the composite material part 212.

With the SMP 214 positioned on the inner shell 226 and the caul 216 placed with the part contact surface 222 against the planar surface of the outer forming mold 228, the SMP deforming tool 224 may be heated to a temperature above Tg. Pressure may be applied to the inner shell 226 to inflate the SMP 214 and press the outer surface of the SMP 214 against the outer forming mold 228 and the SMP contact surface 220 of the caul 216. The SMP 214 may wrap around the interlocking features of the caul 216. After the SMP 214 has been deformed to the shape of the outer forming mold 228 and has coupled with the caul 216, then the temperature is decreased to well below Tg. The pressure may be removed from the inner shell 226. At this point, the integrated SMP and caul tool 200 is ready to form a composite material part 212.

The integrated SMP and caul tool 200 may be used to form a composite material part 212 as follows. Referring to FIG. 12, a layup tool 240 that forms the OML of the composite material part 212 may receive composite material 234 of the types described above. The composite material 234 may be placed on the layup tool 240 using techniques that are known in the art. The integrated SMP and caul tool 200 may be placed on top of the composite material 234. Other integrated SMP and caul tools 200, or tools 250 formed from at least deformed SMP material, may be placed adjacent to the integrated SMP and caul tool 200 with some space therebetween. Additional composite material 234 may be placed in the space with at least some of the composite material 2B being placed in contact with the planar part contact surface 222 of the caul 216.

When all of the composite material 234 has been placed, the composite material 234, the layup tool 240, the integrated SMP and caul tools 200, and any other tools 250 may be heated to cure the composite material 234 at a temperature below Tg. After the composite material 234 has been cured and the composite material part 212 is formed, then the temperature of at least the integrated SMP and caul tool 200 may be raised to a temperature above Tg. The SMP 214 may become malleable and, in the absence of a deforming force or pressure, the SMP 214 may shrink, recede, or contract and return to a relaxed or recovered state. At this point, the integrated SMP and caul tool 200 no longer exists in its previous form, and the SMP 214, without the cauls 216, may be removed from the composite material part 212. The cauls 16 may be removed separately. The composite material part 212, as shown in FIG. 14, may be ready for use or for further processing.

Figure 15:
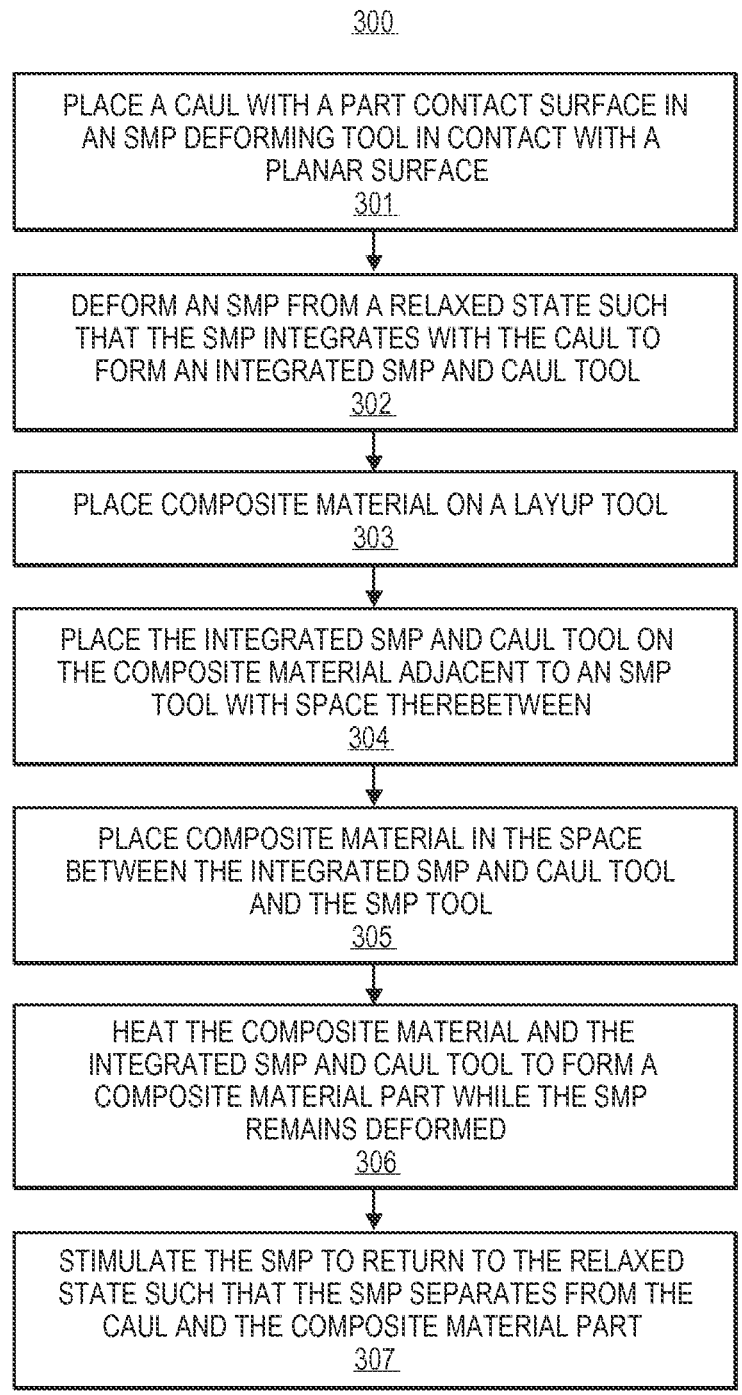
FIG. 15 is a flow diagram of at least a portion of the steps of a method of forming a composite material part using the second embodiment of the integrated shape memory polymer and caul tool.

At least a portion of a method 300 of forming a composite material part 212 using the integrated SMP and caul tool 200 in accordance with various embodiments of the current invention is shown in FIG. 15. The steps may be performed in the order shown in FIG. 15, or they may be performed in a different order. Furthermore, some steps may be performed concurrently as opposed to sequentially. In addition, some steps may be optional.

Referring to step 301, a caul 216 with a part contact surface 222 is placed in an SMP deforming tool 224 in contact with a planar surface. The caul 216 may be constructed from rigid material and may have a Cte that is roughly the same as the composite material 234 used to form the composite material part 212. The part contact surface 222 may be planar. The planar surface of the SMP deforming tool 224 may correspond to a planar surface of the composite material part 212.

Referring to step 302, an SMP 214 is deformed from a relaxed state such that the SMP 214 integrates with the caul 216 to form an integrated SMP and caul tool 200. The SMP 214 may include shape memory polymer materials as listed above with a glass transition temperature Tg. The SMP 214 may be deformed using the SMP deforming tool such that the SMP 214 is positioned on an inner shell 226. An outer forming mold 228 may surround the caul 216, the SMP 214, and the inner shell 226.

Once the outer forming mold 228 is in place and the SMP deforming tool 224 is sealed, the SMP 214 may be heated to a temperature above Tg. Either after the temperature has been raised or at the same time, a positive pressure may be applied to the inner shell so that the SMP 214 is inflated or expanded. The outer surface of the SMP 214 may be pressed against the surfaces of the outer forming mold 228 and against the SMP contact surface 220 of the caul 216. The SMP 214 may wrap around the interlocking features of the caul 216. After the SMP 214 has been deformed to the shape of the outer forming mold 228 and has coupled with the caul 216, then the temperature is decreased to well below Tg. The pressure may be removed from the inner shell 226.

Referring to step 303, composite material 234 is placed on a layup tool 240. The layup tool 240 may be shaped with an inner surface that corresponds to the OML of the composite material part 212.

Referring to step 304, the integrated SMP and caul tool 200 is placed on the composite material 234 adjacent to an SMP tool 250 with space therebetween. The SMP tool 250 may include SMP material that has been deformed to retain the shape of at least one surface or wall of the composite material part 212.

Referring to step 305, composite material 234 is placed in the space between the integrated SMP and caul tool 200 and the SMP tool 250.

Referring to step 306, the composite material 234 is heated to cure the composite material 234 to form a composite material part 212 while the SMP 214 remains deformed. The composite material 234 may be heated to a temperature below Tg.

Referring to step 307, the SMP 214 is stimulated to return to the relaxed state such that SMP 214 separates from the caul 216 and the composite material part 212. The integrated SMP and caul tool 200 may be heated to a temperature above Tg. The SMP 214 becomes malleable and, in the absence of a deforming force or pressure, the SMP 214 shrinks, recedes, or contracts to return to a relaxed or recovered state. At this point, the integrated SMP and caul tool 200 no longer exists in its previous form, and the SMP 214, without the cauls 216, may be removed from the composite material part 212. The cauls 216 may be removed separately. The composite material part 212 may be ready, for use or for further processing.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of forming a composite material part, the method comprising the steps of:
    placing a caul on a positive feature of a mold, wherein the caul is rigid, wherein the positive feature protrudes outward or inward from a surface of the mold, wherein portions of the surface of the mold are not covered by the caul;
    deforming a shape memory polymer (SMP) from a relaxed state against the caul and mold into a geometry that interlocks with features of the caul such that the SMP forms a trapped geometry around the caul to thereby form an integrated SMP and caul tool;
    placing composite material on the integrated SMP and caul tool, wherein at least a portion of the composite material rests directly against the SMP and at least a portion of the composite material rests directly against the caul;
    heating the composite material to cure the composite material to form a composite material part while the SMP remains deformed; and stimulating the SMP to return to the relaxed state such that the SMP separates from the caul and the composite material part.

2. The method of claim 1, wherein the mold is shaped to correspond with at least a portion of an inner mold line (IML) surface of a fuselage, wherein the positive feature is shaped to correspond with a stringer or frame of the fuselage.

3. The method of claim 1, wherein the caul has a coefficient of thermal expansion roughly equal to that of the composite material.

4. The method of claim 1, wherein deforming the SMP from the relaxed state includes the steps of:
heating the SMP to a temperature above the glass transition temperature of the SMP material,
applying a pressure differential to the SMP sufficient to cause the SMP to inflate such that the SMP wraps around the interlocking features included on the caul, and
reducing the temperature of the SMP to below the glass transition temperature.

5. The method of claim 4, wherein expansion of the SMP forms negative features that correspond to additional positive features of the mold.

6. The method of claim 5, wherein composite material is placed in the negative features of the integrated SMP and caul tool.

7. The method of claim 1, wherein the composite material is heated during curing to a temperature below the glass transition temperature.

8. The method of claim 1, wherein stimulating the SMP to return to the relaxed state includes heating the SMP to a temperature above the glass transition temperature.

9. The method of claim 1, wherein the step of deforming the SMP includes triggering the SMP from the relaxed state, forcing portions of the SMP to wrap around beveled edges of the caul, thus retaining the caul via interlocking geometry of the deformed SMP, and then triggering the SMP to become rigid again while the SMP remains deformed.

10. The method of claim 9, wherein the caul is symmetrical about a plane extending along a longitudinal axis of the caul.

* * * * *